(12) United States Patent
Miyata

(10) Patent No.: US 7,847,005 B2
(45) Date of Patent: Dec. 7, 2010

(54) STABILIZED HALOGEN-CONTAINING RESIN COMPOSITION

(75) Inventor: Shigeo Miyata, Kitakyushuu (JP)

(73) Assignee: Kabushiki Kaisha Kaisui Kagaku Kenkyujo, Fukuoka (JP)

( * ) Notice: Subject to any disclaimer, the term of this patent is extended or adjusted under 35 U.S.C. 154(b) by 44 days.

(21) Appl. No.: 12/379,385

(22) Filed: Feb. 20, 2009

(65) Prior Publication Data

US 2009/0215950 A1 Aug. 27, 2009

(30) Foreign Application Priority Data

Feb. 22, 2008 (JP) .............................. 2008-041412

(51) Int. Cl.
*C08K 3/10* (2006.01)
*C09K 15/00* (2006.01)

(52) U.S. Cl. ...................................... 524/435; 252/397

(58) Field of Classification Search .................. 524/435
See application file for complete search history.

(56) References Cited

U.S. PATENT DOCUMENTS 5,133,899 A * 7/1992 Nakazawa et al. ....... 252/400.3

FOREIGN PATENT DOCUMENTS

| CA | 218738 | 12/1997 |
|----|--------|---------|
| DE | 196 41 551 | 4/1997 |
| EP | 1048689 A1 * | 11/2000 |

OTHER PUBLICATIONS

STIC search results, Aug. 5, 2009.*
European Search Report issued May 19, 2009 in connection with EP 09 25 0439 corresponding to the present U.S. patent application.

* cited by examiner

*Primary Examiner*—Ling-Siu Choi
*Assistant Examiner*—Hui Chin
(74) *Attorney, Agent, or Firm*—Wenderoth, Lind & Ponack, L.L.P.

(57) ABSTRACT

A stabilized halogen-containing resin composition containing a halogen-containing resin and a stabilizer component comprising a complex (A) of a metal silicate and a calcium hydroxide compound and at least one member selected from a hydrotalcite (B) and a tin-containing stabilizer (C), which composition has synergism (multiplier effect), overcomes the problems of decreases, due to the high loading of a stabilizer, in the inherent mechanical strength and electrical characteristic of the resin and makes reduction of cost of stabilizers, and a process for producing the complex (A).

8 Claims, No Drawings

STABILIZED HALOGEN-CONTAINING RESIN COMPOSITION

TECHNICAL FIELD

The present invention relates to a stabilized halogen-containing resin composition having excellent thermal stability and processing stability. More specifically, the present invention relates to a stabilized halogen-containing resin composition which exhibits a synergistic effect by jointly containing a complex of a metal silicate and a calcium hydroxide compound together with a hydrotalcite and/or a tin-containing stabilizer.

BACKGROUND ARTS OF THE INVENTION

A halogen-containing resin is unstable with regard to heat or light. Therefore, it is necessary to incorporate a thermal stabilizer before thermal melting and molding. Metal soaps such as Cd/Ba, Ba/Zn and Ca/Zn, lead stabilizers, tin stabilizers and hydrotalcites are used as the thermal stabilizer. However, the use of a toxic stabilizer is gradually limited or prohibited in recent years. The use of stabilizers containing Cd and Pb and additionally Ba is rapidly decreased. Hydrotalcites and Ca/Zn-containing stabilizers are widely used in place of the above stabilizers. Tin stabilizers are used since the toxicity thereof is less than that of Cd or Pb. However, when a hydrotalcite is used for an electric cable, in particular for a highly heat-resistant electric cable, it is required to incorporate the hydrotalcite in a large amount so that the mechanical strength or electric insulation of a halogen-containing resin is undesirably impaired. The tin stabilizers are in a liquid state so that a problem is that processing stability is poor or they decrease the softening point of a resin.

A complex of a metal silicate and a calcium hydroxide compound, which has been invented by the present inventor, (Japanese Patent Application No. 2007-52892) brings about an improvement in the initial coloration of a hard halogen-containing resin composition, which coloration is a defective of a calcium hydroxide compound, and also brings about an improvement in thermal stability.

However, with regard to a soft halogen-containing resin composition, for example, for a high heat-resistant electric cable, the thermal stability of the complex is almost the same as that of a hydrotalcite.

Therefore, it is required to incorporate the complex in a large amount so that the electric insulation or flexibility of the electric cable is largely reduced. For solving this problem, a higher-performance stabilizer, which can give intended stabilization even when incorporated in a smaller amount, is demanded.

On the other hand, calcium stearate is added as a lubricant for the purpose of improving processability in many cases In these cases, initial coloration becomes strong as compared with a case where calcium stearate is not added. Therefore, when the complex is incorporated even for uses other than electric cable, it is required to make a further improvement in terms of the initial coloration.

SUMMARY OF THE INVENTION

It is an object of the present invention to overcome problems of a decrease in the inherent excellent mechanical strength and electric insulation of a halogen-containing resin and an increase in cost, which problems are caused since even a hydrotalcite, which is most excellent in thermal stability, is required to be incorporated in a large amount of about 6 parts by weight into 100 parts by weight of the halogen-containing resin with regard to a highly heat resistant electric cable.

It is another object of the present invention to overcome the instability of the processability of a tin-containing stabilizer.

The present invention provides a stabilized halogen-containing resin composition containing 100 parts by weight of a halogen-containing resin and 0.01 to 10 parts by weight, preferably 0.1 to 4 parts by weight, of a thermal stabilizer component comprising a complex (A) of a metal silicate and a calcium hydroxide compound represented by the formula (1), $$Ca_{1-x-y}M^{2+}{}_{x}Al_{y}(OH)_{2} \qquad (1)$$

wherein $M^{2+}$ represents at least one bivalent metal selected from the group consisting of Mg, Zn, Cu and etc., preferably Mg and/or Zn, x is in the range of $0 \leq x \leq 0.4$ and y is in the range of $0 \leq y \leq 0.1$, and at least one member selected from the group consisting of a hydrotalcite (B) and a tin-containing stabilizer (C).

The present inventor has found that a combination of (A) and (B) and/or (C) exhibits a remarkable synergistic effect.

EFFECT OF THE INVENTION

As compared with a single use of the complex (A), the hydrotalcite (B) or the tin-containing stabilizer (C), the combinational use of the complex (A) with the hydrotalcite (B) and/or the tin-containing stabilizer (C) increases thermal stability by 150 to 200%. When the complex (A) is used in combination with the tin-containing stabilizer (C), the processing stability of the tin-containing stabilizer is remarkably improved and a softening point is also increased.

DETAILED DESCRIPTION OF THE INVENTION

In the complex (A) used in the present invention, a metal silicate has chemical interaction with a calcium hydroxide compound and as a result thereof the primary crystallite size of the calcium hydroxide compound becomes extremely small so that the reaction activity as a thermal stabilizer is improved. The complex (A) has a BET specific surface area of at least 20 m²/g, preferably at least 30 m²/g. The BET specific surface area of calcium hydroxide is about 5 to 10 m²/g. The difference in BET specific surface area is obvious. The complex (A) can be produced by thermally hydrating a metal silicate represented by the formula (2), $$(Al_2O_3)_a(M^{2+}O)_b SiO_2 \cdot (H_2O)_m \qquad (2)$$

wherein $M^{2+}$ is at least one bivalent metal selected from the group consisting of Zn, Mg, Ca and etc., preferably Zn and/or Mg, a is in the range of $0 \leq a \leq 0.5$, b is in the range of $0 \leq b \leq 1$, provided that a+b is in the range of $0 < a+b < 1$, and m is in the range of $0 \leq m \leq 2$, with calcium oxide or a solid solution comprised of calcium oxide and $M^{2+}$ and/or Al in an aqueous medium. In this case, the hydration reaction is carried out at preferably 60° C. or higher, particularly preferably 80° C. or higher, for preferably 10 to 30 minutes with stirring. As a production process other than the above process, it is possible to add an aqueous solution of a water-soluble salt of $M^{2+}$ and/or Al such as a chloride or a nitrate after the above hydration reaction and allow the resultant mixture to react. Thereafter, the complex (A) is preferably surface-treated with a higher fatty acid or an alkali metal salt of a higher fatty acid, a phosphoric acid ester, a silane coupling agent, a titanium coupling agent or an aluminum coupling agent in an amount of 0.1 to 10% by weight based on the weight of the complex (A).

Examples of the metal silicate include crystalline activated white clay, acid white clay, amorphous aluminum silicate, zinc silicate and zinc aluminum silicate. The complexing amount of the metal silicate based on the calcium hydroxide compound is 0.5 to 40% by weight, preferably 1 to 10% by weight, particularly preferably 2 to 8% by weight.

The hydrotalcite (B) used in the present invention is known as a thermal stabilizer. The hydrotalcite (B) is represented by the formula (4), $$(Mg \text{ and/or } Zn)_{1-d}(Al)_d(OH)_2(A^{n-})_{d/n} \cdot (H_2O)_p \qquad (4)$$

wherein $A^{n-}$ represents an anion having a valence of n (n is an integer), preferably $CO_3^{2-}$, d is in the range of $0<d<0.5$, preferably $0.25<d<0.4$, and p is in the range of $0 \leqq p<4$.

It is also preferred that the hydrotalcite (B) is surface-treated similarly to the complex (A). The hydrotalcite (B) preferably has a secondary particle diameter of 1 μm or less and a BET specific surface area of 5 to 20 m²/g.

The tin-containing stabilizer (C) used in the present invention is an organotin compound represented by the formula (5), $$R_z S_n Y_{4-z} \qquad (5)$$

wherein R represents an alkyl group such as methyl, butyl or octyl, Y represents at least one member selected from the group consisting of mercaptides, maleates and carboxylates, and z is 1 or 2.

Specific examples of the tin-containing stabilizer (c) include mono or dimethyltin stearoxy ethyl mercaptide, dimethyltin-2-ethylhexylthioglycolate, dibutyltinmaleate, dibutyltindilaurate, dimethyltinbis-2-ethylhexyl thioglycolate and mono or dioctyltin-2-ethylhexyl thioglycolate.

The weight ratio of the complex (A):the hydrotalcite (B) is preferably 20-80:80-20, particularly preferably 40-75:60-25. The weight ratio of the complex (A) the tin-containing stabilizer (C) is preferably 5-40:95-60, particularly preferably 15-40:85-60. The combinational use of the complex(A) with the hydrotalcite (B) and/or the tin-containing stabilizer (C) solves the problem of the initial colorability, which is a defect of the complex (A), improves thermal stability largely, improves the torque stability of the tin-containing stabilizer at a processing time and, in addition, brings about an improvement in terms of a decrease of the softening point of a resin.

It is preferred that the stabilized halogen-containing resin composition of the present invention further contains at least one member selected from the group consisting of an organic acid salt of zinc and/or calcium (a) in an amount of 0.01 to 2 parts by weight, preferably 0.1 to 1 part by weight, a β-diketone (b) in an amount of 0.001 to 2 parts by weight, preferably 0.01 to 1 part by weight, a polyhydric alcohol (c) in an amount of 0.0001 to 5 parts by weight, preferably 0.1 to 2 parts by weight, and a plasticizer (d) in an amount of 0.1 to 100 parts by weight in addition to the stabilizer of the present invention.

Examples of the organic acid salt of zinc and/or calcium (a) used in the present invention include metals salts of zinc and/or calcium with organic acids such as lauric acid, palmitic acid and stearic acid.

The β-diketone (b) used in the present invention is a compound effective for the prevention of initial coloration, which is represented by the formula (6), $$R_1 - CO - CHR_2 - COR_3 \qquad (6)$$

wherein $R_1$ and $R_3$ are the same or different and represent a linear or branched alkyl or alkenyl group having 30 or less carbon atoms, an aryl group or an alicyclic group, and $R_2$ represents hydrogen, an alkyl group or an alkenyl group.

Preferred examples of the β-diketone (b) include dibenzoylmethane (DBM), stearoylbenzoylmethane (SBM), benzoylacetone, acetylacetone and dehydroacetic acid.

The polyhydric alcohol (c) used in the present invention is effective for improvement in thermal stability. The polyhydric alcohol (c) is a polyhydric alcohol or a partial ester of a polyhydric alcohol and mono or polycarboxylic acid. Examples thereof include mannitol, sorbitol, pentaerythritol, dipentaerythritol and trimethylolpropane.

Examples of the plasticizer (d) used in the present invention include phthalic acid ester plasticizers such as DOP and DINP, aliphatic diacid ester plasticizers such as DOA and DOS, chlorinated paraffin plasticizers, polyester plasticizers, epoxy plasticizers, phosphoric acid ester plasticizers, and trimellitic acid ester plasticizers such as TOTM and TIDTM.

The complex (A) used in the present invention is thought as follows. That is, the calcium hydroxide compound which has strong alkalinity (in other words, solid base) interacts with a solid acid of the metal silicate and the solid acid which has an electron-accepting property captures a donor electron of the calcium hydroxide compound. Accordingly, coloration of vinyl chloride is reduced and, at the same time, chemical neutralization occurs, which prevents the decomposition of vinyl chloride and other additive. The complex (A) shows an X-ray diffraction pattern of calcium hydroxide, and a crystal material other than calcium hydroxide is not detected. Therefore, it is thought that the solid acid and the solid base interact with each other to neutralize the functions of the solid acid and the solid base in the above complex (A). It is thought that, owing to this neutralization, the complex (A) of the present invention is able to reduce the coloration of the halogen-containing resin at the time of processing and prevent the increase of torque.

Calcium hydroxide crystals of the complex (A) of the present invention are finer than crystals of calcium hydroxide which is not complexed. Therefore, the complex (A) has a higher BET specific surface area than a calcium hydroxide compound and has an effect of improving a thermostable time of the halogen-containing resin.

Examples of the halogen-containing resin used in the present invention include chlorine-containing synthetic resins such as polyvinyl chloride, polyvinylidene chloride, chlorinated polyethylene, chlorinated polypropylene, chlorinated rubber, a vinyl chloride-vinyl acetate copolymer, a vinyl chloride-ethylene copolymer, a vinyl chloride-propylene copolymer, a vinyl chloride-styrene copolymer, a vinyl chloride-isobutylene copolymer, a vinyl chloride-vinylidene chloride copolymer, a vinyl chloride-styrene-maleic anhydride ternary copolymer, a vinyl chloride-styrene-acrylonitrile copolymer, a vinyl chloride-butadiene copolymer, a vinyl chloride-isoprene copolymer, a vinyl chloride-chlorinated propylene copolymer, a vinyl chloride-vinylidene chloride-vinyl acetate ternary copolymer, a vinyl chloride-acrylic acid ester copolymer, a vinyl chloride-maleic acid ester copolymer, a vinyl chloride-methacrylic acid ester copolymer, a vinyl chloride-acrylonitrile copolymer and copolymers of vinyl chloride and a variety of vinyl ethers. Further, examples of the halogen-containing resin include a blend resin, a block copolymer and a graft copolymer, each of which is obtained from at least two above chlorine-containing synthetic resins or from a synthetic resin containing no chlorine and any one of the above chlorine-containing synthetic resins.

The resin composition of the present invention can further contain a common additive. Examples of the above additive include a phosphite thermal stabilization assistant such as bisphenol A tetra $C_{12-15}$ alkyldiphosphite, tridecyl phosphite, trilauryl phosphite or tris(monophenyl)phosphite; an epoxy stabilizer such as an epoxidized vegetable oil, an epoxidized oleic acid ester or an epoxidized erucic acid ester; a sulfur-containing compound stabilizer such as thiodipropionic acid or a diethyl thiodipropionic acid ester, a phenol stabilizer such as alkyl gallate, phenol typified by alkylated phenol, or styrenated phenol; a stabilizer of an α-amino acid or its functional derivative such as glycine, alanine, leucine, isoleucine, glycinamide, histidine ethyl ester or tryptophan benzyl ester; and an antioxidant such as styrenated para-cresol, 2,6-ditertiarybutyl-4-methylphenol, butylated anisole, 4,4'-methylenebis(6-tertiarybutyl-3-methylphenol), 2,2'-methylenebis(6-tertiarybutyl-4-methylphenol), 1,3,5-trimethyl-2,4,6-tris (3,5-ditertiarybutyl-4-hydroxybenzyl)benzene or tetrakis[3-(4-hydroxy-3,5-ditertiarybutylphenyl) propionyloxymethylene]methane.

The amount of the above additive to be added can be selected as required. For example, the amount of the above stabilizers is about 0.01 to about 5 parts by weight based on 100 parts by weight of the halogen-containing resin and the amount of the above antioxidant is about 0.01 to about 2 parts by weight based on 100 parts by weight of the halogen-containing resin.

The resin composition of the present invention can further contain, other than the above additive, a common different additive such as a lubricant, a processing assistant, a weather-resistance improving agent, an antistatic agent, a defogging agent, a reinforcing agent, a filler or a pigment. In the present invention, the halogen-containing resin is mixed and kneaded with the stabilizers of the present invention and optionally other additive(s) by a common method which can mix them homogeneously. For example, it is possible to adopt a mixing and kneading device, as required, such as a uniaxial or biaxial extruder, a roll or a Banbury mixer. A molding method is not specially limited. For example, it is possible to adopt a molding means, as required, such as injection, molding, extrusion molding, blow molding, press molding, rotational molding, calendar molding, sheet forming molding, transfer molding, laminate molding or vacuum molding.

The present invention will be explained with reference to Examples, hereinafter.

EXAMPLE 1

[Production of Complex (A) of Metal Silicate and Calcium Hydroxide Compound]

2.5 liters of water was placed in a stainless-steel vessel having a volume of about 7 liters. 15 g of a powder (BET=215 $m^2/g$) of a synthetic aluminum silicate; $(Al_2O_3)_{0.1}SiO_2 \cdot (H_2O)_{0.83}$ was added to the vessel with stirring and the resultant mixture was temperature-increased to about 50° C. Then, 320 g of calcium oxide (purity 98%) was added, the mixture was temperature-increased to about 90° C. with continuing stirring, and the mixture was allowed to react for 15 minutes. Then, 108 ml of a magnesium chloride (1.0 mol/liter) aqueous solution was added and the mixture was allowed to react for further 10 minutes Then, 200 ml of an aqueous solution (about 80° C.) in which 15 g of sodium stearate (purity 90%) was dissolved was added to carry out surface treatment. Then, filtering, washing with water, drying (about 120° C.) and pulverization were carried out, to obtain a powder. The powder showed an X-ray diffraction pattern of calcium hydroxide, although the X-ray diffraction pattern of the powder was slightly shifted to a high angle side. The BET specific surface area of the powder was 45 $m^2/g$. The average secondary particle diameter thereof at an accumulation of 50% was 1.1 μm. As a result of chemical analysis and fluorescent x-ray analysis, the chemical composition (molar ratio) was as follows. $Ca:Mg:SiO_2:Al_2O_3=0.98:0.02:0.03:0.003$.

EXAMPLE 2

A powder was obtained in the same manner as in Example 1 except that the powder of the synthetic aluminum silicate was replaced with 29 g of a powder (BET=250 $m^2/g$) of zinc aluminum silicate; $(ZnO)_{0.09}(Al_2O_3)_{0.01}SiO_2 \cdot (H_2O)_{0.80}$ and that the magnesium chloride aqueous solution was replaced with 56 ml of a zinc chloride (1.0 mol/liter) aqueous solution. The powder showed an X-ray diffraction pattern of calcium hydroxide, although the X-ray diffraction pattern of the powder was slightly shifted to a high angle side. The BET specific surface area of the powder was 42 $m^2/g$. The average secondary particle diameter thereof at an accumulation of 50% was 0.98 μm. As a result of chemical and fluorescent x-ray analysis, the molar ratio was as follows. $Ca:Zn:SiO_2:Al_2O_3=0.99:0.01:0.06:0.002$.

EXAMPLE 3

A powder was obtained in the same manner as in Example 1 except that the powder of the aluminum silicate was replaced with 35 g of a powder (BET=290 $m^2/g$) of activated white clay; $(Al_2O_3)_{0.07}(MgO)_{0.04}(SiO_2) \cdot (H_2O)_{0.23}$, that the sodium stearate was replaced with stearyl acid phosphate, which was dissolved under heat in isopropyl alcohol, and that the magnesium chloride was not used. The X-ray diffraction pattern of the powder was the same as the diffraction pattern of calcium hydroxide alone. The BET specific surface area of the powder was 40 $m^2/g$. The average secondary particle diameter thereof at an accumulation of 50% was 1.2 μm. The chemical structure as a molar ratio was $Ca:SiO_2:Al_2O_3=1:0.075:0.005$.

EXAMPLE 4

One of the complexes (A) of metal silicate and a calcium hydroxide compound obtained in Examples 1 to 3 was mixed with a hydrotalcite (B) (trade name; ALCAMIZER 1, rough chemical composition; $Mg_{0.08}Al_{0.32}(OH)_2(CO_3)_{0.16}(H_2O)_{0.5}$). The thus-obtained mixture was used as a stabilizer in the following mixing recipe.

| | |
|---|---|
| Polyvinyl chloride (molecular weight 700) | 100 parts by weight |
| TOTM (tri-2-ethylhexyltrimellitate) | 50 parts by weight |
| Calcium carbonate | 50 parts by weight |
| Zinc stearate | 0.4 part by weight |
| Calcium stearate | 0.1 part by weight |
| DBM | 0.1 part by weight |
| SBM | 0.1 part by weight |
| Irganox 1010 | 0.1 part by weight |
| Stabilizer | 2.7 parts by weight |

A mixture was obtained according to the above recipe and the mixture was kneaded with an open roll at 170° C. for 5 minutes, to obtain a sheet. The sheet was subjected to a congo red test (CR) at 200° C. in conformity with JIS-K6723 and to a press heat-resistance test at 190° C. under a pressure of 100 $kg/cm^2$. The state of coloration was evaluated 60 minutes later. Further, the time required for blackening was evaluated. Table 1 shows the results as Examples 4-1 to 4-5.

COMPARATIVE EXAMPLES 1 TO 4

The procedure of Example 4 was repeated except that the complex (A) obtained in Example 1 (Comparative example 1) the complex (A) obtained in Example 2 (Comparative Example 3) or the complex (A) obtained in Example 3 (Comparative Example 4) alone was used as the stabilizer without the hydrotalcite. Table 1 shows the results. The procedure of Example 4 was repeated except that the hydrotalcite was used as the stabilizer without the complex (A) (Comparative Example 2). Table 1 shows the results.

COMPARATIVE EXAMPLE 5

A powder of calcium hydroxide was obtained in the same manner as in Example 1 except that the metal silicate and the magnesium chloride were not used. The BET specific surface area of the powder was 7 $m^2/g$ and the average secondary particle diameter thereof at an accumulation of 50% was 2.2 μm. Thereafter, the procedure of Example 4 was repeated except that the above powder of the calcium hydroxide was used as the stabilizer. Table 1 shows the results.

TABLE 1

[Evaluation results for highly heat-resistant electric cable recipe]

| | Kind of (A) | Mixing ratio of (A) and (B) (% by weight) | Results of congo red test (minute) | Press resistance test Color after 60 minutes | Press resistance test Time required for blackening (minute) |
|---|---|---|---|---|---|
| Ex. 4-1 | Ex. 1 | 50:50 | 150 | White | More than 240 |
| Ex. 4-2 | Ex. 1 | 60:40 | 160 | White | More than 240 |
| Ex. 4-3 | Ex. 1 | 70:30 | 150 | White | More than 240 |
| CEx. 1 | Ex. 1 | 100 | 96 | Yellow | More than 240 |
| CEx. 2 | Hydrotalcite | 100 | 100 | White | 150 |
| Ex. 4-4 | Ex. 2 | 65:35 | 170 | White | More than 240 |
| CEx. 3 | Ex. 2 | 100 | 102 | Yellow | More than 240 |
| Ex. 4-5 | Ex. 3 | 60:40 | 145 | White | More than 240 |
| CEx. 4 | Ex. 3 | 100 | 86 | Yellow | More than 240 |
| CEx. 5 | Calcium hydroxide | 100 | 60 | Yellowish brown | 180 |

Ex. = Example,
CEx. = Comparative Example.

EXAMPLE 5

The complex (A) obtained in Example 1 was used in combination with a tin-containing stabilizer (dimethyl tin mercaptide) in a weight ratio of 30:70 in the following mixing recipe. A mixture was obtained according to the following recipe, the mixture was kneaded with an open roll at 180° C. and then it was subjected to a press heat-resistance test at 200° C. under 100 kg/cm².

| | |
|---|---|
| PVC | 100 parts by weight |
| Lubricant (Loxiol G32) | 0.50 part by weight |
| Lubricant (Loxiol G70S) | 0.30 part by weight |
| Tin-containing stabilizer | 0.8 part by weight |
| Complex (A) | 0.4 part by weight |

Further, the mixture obtained according to the above recipe was subjected to a dynamic thermal stability test using Brabender Plastograph under conditions of a temperature of 190° C., a rotational speed of 40 rpm and a loading amount of 60 g. Table 2 shows the results.

COMPARATIVE EXAMPLES 6 AND 7

For comparison, the procedure of Example 5 was repeated except that 1.2 parts by weight of the tin-containing stabilizer alone was used (Comparative Example 6) or 1.2 parts by weight of the complex (A) alone was used (Comparative Example 7). Table 2 shows the results of evaluations.

TABLE 2

[Dynamic thermal stability]

| | Maximum torque (Nm) | Stabilization time (minute) | Press heat-resistance coloration (after 40 minutes) | Time required for blackening (minute) |
|---|---|---|---|---|
| Example 5 | 46 | 28 | White | 90 |
| Comparative Example 6 | 57 | 17 | White | 50 |
| Comparative Example 7 | 48 | 20 | Yellowish brown | 70 |

Further, softening points were measured by a Vicat method. As a result thereof, it was 84° C. in Comparative Example 6 (tin-containing stabilizer alone) and it was 85.4° C. in Example 5, so that it was found that the softening point was improved in Example 5.

What is claimed is:

1. A stabilized halogen-containing resin composition containing 100 parts by weight of a halogen-containing resin and 0.01 to 10 parts by weight of a stabilizer component comprising a complex (A) of a calcium hydroxide compound represented by formula (1) and at least one metal silicate selected from the group consisting of activated white clay, acid white clay and a compound represented by formula (2), $$Ca_{1-x-y}M^{2+}_xAl_y(OH)_2 \quad (1)$$

wherein $M^{2+}$ represents at least one bivalent metal selected from the group consisting of Mg, Zn and Cu, x is in the range of $0 \leq x \leq 0.4$ and y is in the range of $0 \leq y < 0.1$, $$(Al_2O_3)_a(M^{2+}O)_b SiO_2 \cdot (H_2O)_m \quad (2)$$

wherein $M^{2+}$ is at least one member selected from the group consisting of Zn, Mg and Ca, a is in the range of $0 \leq a \leq 0.5$, b is in the range of $0 \leq b < 1$, provided that a+b is in the range of $0 < a+b < 1$, and m is in the range of $0 \leq m < 2$, and at least one member selected from the group consisting of a hydrotalcite (B) and a tin-containing stabilizer (C).

2. The stabilized halogen-containing resin composition according to claim 1, wherein the calcium hydroxide compound is represented by formula (3), $$Ca_{1-x}M^{2+}_x(OH)_2 \quad (3)$$

wherein $M^{2+}$ and x are as defined in formula (1).

3. The stabilized halogen-containing resin composition according to claim 2, wherein, in formula (3), $M^{2+}$ is at least one member selected from the group consisting of Mg and Zn and x is in the range of $0 \leq x \leq 0.2$.

4. The stabilized halogen-containing resin composition according to claim 1, wherein the metal silicate is complexed in an amount of 0.5 to 50% by weight based on the calcium hydroxide compound in complex (A).

5. The stabilized halogen-containing resin composition according to claim 1, wherein the stabilized halogen-containing resin composition is used for a highly heat-resistant electric cable and the weight ratio of the complex (A): the hydrotalcite (B) is 40:60-75:25.

6. The stabilized halogen-containing resin composition according to claim 1, wherein the weight ratio of the complex (A): the tin-containing stabilizer (C) is 15:85-40:60.

7. The stabilized halogen-containing resin composition according to claim 1, wherein complex (A) is surface-treated with at least one member selected from the group consisting of a higher fatty acid, an alkali metal salt of a higher fatty acid, a phosphoric acid ester, a silane coupling agent, an aluminum coupling agent and a titanium coupling agent in an amount of 0.1 to 10% by weight based on complex (A).

8. A process for the production of complex (A) recited in claim 1, comprising:

hydrating calcium oxide in an aqueous medium containing a metal silicate dispersed therein, adding an aqueous solution comprising a water-soluble salt of at least one bivalent metal selected from the group consisting of Mg and Zn allowing the resultant mixture to react, and carrying out surface-treatment.

* * * * *